United States Patent [19]

Hoedl

[11] Patent Number: 5,075,057

[45] Date of Patent: Dec. 24, 1991

[54] MANUFACTURE OF MOLDED COMPOSITE PRODUCTS FROM SCRAP PLASTICS

[76] Inventor: Herbert K. Hoedl, R.R. #3, New Market, Ontario, Canada, L3Y 4W1

[21] Appl. No.: 638,599

[22] Filed: Jan. 8, 1991

[51] Int. Cl.⁵ .............................................. B29C 43/02
[52] U.S. Cl. .................... 264/115; 264/122; 264/DIG. 69
[58] Field of Search ....... 264/115, 122, 126, DIG. 69, 264/37

[56] References Cited

U.S. PATENT DOCUMENTS

| | | | |
|---|---|---|---|
| 3,806,562 | 4/1974 | Lamort | 264/115 |
| 3,956,541 | 5/1976 | Pringle | 428/2 |
| 4,016,232 | 4/1977 | Pringle | 264/112 |
| 4,028,288 | 6/1977 | Turner | 264/109 |
| 4,187,352 | 2/1980 | Klobbie | 521/79 |
| 4,279,790 | 7/1981 | Nakajima | 264/122 |
| 4,339,363 | 7/1982 | Nakajima | 524/34 |
| 4,364,979 | 12/1982 | Dutton | 428/2 |
| 4,396,566 | 8/1983 | Brinkmann et al. | 264/70 |
| 4,427,818 | 1/1984 | Prusinski | 524/442 |
| 4,874,095 | 10/1989 | Warych | 206/586 |
| 4,968,463 | 11/1990 | Levasseur | 264/40.1 |
| 4,970,043 | 11/1990 | Doan et al. | 264/237 |
| 4,997,609 | 3/1991 | Neefe | 264/122 |

*Primary Examiner*—Mary Lynn Theisen
*Attorney, Agent, or Firm*—Lyon & Lyon

[57] ABSTRACT

Scrap plastic materials including thermoplastic and cured thermosetting components are recycled and molded into products of predetermined shape, without the necessity of separating the different plastics from one another, by a process of shredding and milling the mixture to reduce it to a fine particle size, homogenizing the fine particle size mixture into a free flowing macro homogenous powder form, warming the homogenized mixture to an elevated temperature but at which it maintains its free flowing condition, dry blending the warm mixture with a reinforcing material or a filler and then compression molding the blend at elevated temperatures and pressures into a product of pre-determined shape.

16 Claims, No Drawings

MANUFACTURE OF MOLDED COMPOSITE PRODUCTS FROM SCRAP PLASTICS

FIELD OF THE INVENTION

This invention relates to waste product recycling processes, and more particularly to processes for the recovery and reuse of scrap plastics materials.

BACKGROUND OF THE INVENTION

Scrap plastics materials as collected from refuse sites, manufacturing operation wastes, household wastes, "fluff" from shredded automobiles and the like are commonly complex mixtures of many diverse waste materials-paper, thermoplastic products, cured thermosetting products, metals, fibrous products, etc. It is difficult and commonly uneconomic to proceed through one or more sorting and separating steps before the recycling process. Plastics materials are particularly difficult in this regard, since successful recycling and reuse of plastics materials in useful products may require the sorting of the scrap products into different types and grades of such plastics.

Particularly difficult materials to handle in complex scrap mixtures are cured thermoset resins. Conventionally, these will not melt for remolding purposes, even after separation and isolation from scrap mixtures. Also, they are commonly associated with fibrous reinforcements such as glass fibres, which are equally difficult to separate and reuse.

Accordingly, there is a need for a process which will permit the recycling and reuse into useful products, of complex mixtures of waste materials which include in their composition substantial quantities of cured thermoset plastics materials.

DISCUSSION OF THE PRIOR ART

Attempts have been made in the past to make chipboard-like products using thermoplastics-containing scrap materials as the binder or glue therein. As is well known, chipboard is conventionally made of wood chips and liquid/powder uncured thermoset resins. The resins, which act as the binder or glue, are pressed into chipboard products in continuous or discontinuous processes, and subsequently cured under heat and pressure so that the wood chips become held together by the polymerized and cured resins (melamine, phenolics, polyurethanes, etc.). Attempts to use mixed thermoplastics scrap resins, sometimes contaminated with other substances such as paper, metals, textiles, wood, etc. have focused on extrusion, kneading and injection molding processes. These allow recycling of thermoplastic waste directly into finished or semi-finished products, without separation of the components of the waste or intensive washing thereof.

U.S. Pat. No. 4,187,352 Klobbie, for example, discloses a process in which unsorted thermoplastic synthetic resin waste material is formed into an article having the working and processing properties of wood by subjecting the mixture to a mixing operation in a housing including a screw/kneading member so that it is extruded into a finished product.

The disadvantage of such kneading/extrusion/injection molding processes is that the resulting products are of widely variable and inconsistent properties because of the incompatibility of the ingredients of the mixture with one another. When fillers and reinforcements such as wood chips, glass fibres and the like are added to such mixtures of materials and then the mixture is subjected to an injection molding or extrusion process, the strength properties thereof are substantially reduced, largely due to the mechanical destruction or impairment of the fibres during the extrusion or injection molding process.

U.S. Pat. No. 3,956,541 Pringle, and its companion patents numbers 4,016,232 and 4,016,233, disclose a process for making flexible structural members, namely cable reels, using scrap wire and cable insulation, namely polyvinylchloride and polyethylene, and possibly using other scrap materials as well. The scraps are shredded in combination with the wire remnants, and the wire is separated from the shredded insulation. This scrap is then mixed with phenolic resin, zinc stearate and wood filler, and compression molded to form flexible objects. A non-homogeneous product is formed, containing discreet zones of thermoplastic material, acting like an impact modifier to the otherwise brittle phenolics/wood compound.

U.S. Pat. No. 4,279,790 Nakajima, and its companion Patent 4,339,363, describe the preparation of composite material compositions of waste paper, thermoplastic resins and other additives, mixed together as the paper is dried from a slurry condition. The includsion of synthetic rubber, normally a thermoset, is suggested in this patent. The final products are formed by injection molding.

U.S. Pat. No. 4,364,979 Dutton discloses a substitute for wood in particle boards, which comprises waste materials such as chicory roots and coffee grounds as obtained from an instant coffee manufacturing plant. The binder which is proposed is new, previously unused thermoset resin such as urea-formaldehyde resin.

U.S. Pat. No. 4,396,566 Brinkmann discloses a process for the continuous manufacture of sheeting from thermoplastic synthetic resins, in which the resin is used in the form of particles and passed continuously through a preheating zone, and then through a treatment zone in which it is pressed and compacted to form a visually appealing flexible sheet material. The possibility of using waste strips of thermoplastic synthetic resin is disclosed, but no use of fillers is suggested.

U.S. Pat. No. 4,427,818 Prusinski, discloses building blocks made from contaminated scrap materials by a process of mixing and heating, then cooling in molds. It relates to the use of a widely varying composition including thermoplastic resins, but does not disclose the use of scraps containing mixtures of thermoplastic and cured thermosetting resins.

It is an object of the present invention to provide a novel process for the recycle and reuse of scrap materials containing mixtures of thermoplastic and cured thermosetting resins.

It is a further and more specific object of the present invention to provide a process of making sheet and board materials of the chipboard type, having reinforcing materials bound together by scrap thermoplastic-thermosetting resin mixtures.

SUMMARY OF THE INVENTION

It has now been found that scrap mixtures containing both thermoplastic and cured thermosetting resins in substantial quantities can be used as the binder in preformed products containing reinforcing materials and/or fillers, in a process of compression molding/laminating of the mixtures thereof, provided that the scrap material mixture is first reduced to a fine particle, powder size and is homogenized to form a macro homogeneous powder mixture, before it is mixed and intimately dispersed with the filler or reinforcement prior to compression molding. The process of the invention allows the utilization of mixed scrap material, without the need for separation of the individual components thereof, and the formation there from of chipboard-like products of good physical properties, avoiding the deterioration of properties normally obtained by injection molding or extrusion of such products.

Thus, according to the present invention, there is provided a process of recycling and molding scrap plastics material into products of predetermined shape, the scrap material comprising a mixture of thermoplastic material and thermosetting material and optionally containing other organic or inorganic ingredients, the process comprising the steps of:

(a) shredding and milling the mixture to reduce it to a fine particle size such that substantially all the particles thereof have a maximum dimension not greater than about 1 mm;

(b) homogenizing the fine particle size mixture so formed into a free-flowing, macrohomogeneous powdered form;

(c) warming the homogenized mixture so formed to an elevated temperature which is at least 80° C. but is one at which the mixture maintains its free-flowing condition;

(d) dry blending the warm mixture with at least one additive material selected from reinforcing materials and fillers in an amount such that the blend contains at least 10% by weight of homogenized thermoplastic components mixture, and forming an intimately dispersed blend thereof;

(e) compression molding the blend at elevated temperatures and pressures into a product of predetermined shape.

By the term "macrohomogeneous" as used herein, there is meant a product which, on sampling and analyzing several macro extractable aliquots, e.g. of weight ten grams each, substantially identical analytical results for components are obtained, even though analysis of micro samples under a microscope may reveal the presence of different particles in different quantities. The macrohomogeneous product formed during the process of the present invention is a powdered, free-flowing particulate material.

DESCRIPTION OF THE PREFERRED EMBODIMENTS

The scrap materials which can be recycled and used in the present invention can be of very wide and diverse composition. They should preferably contain a minimum of 20% by weight of thermoplastics materials, such as polyethylene, polypropylene, polystyrene, impact polystyrene, polyvinyl chloride, acrylonitrile-butadiene-styrene resins, expanded polypropylene, polyamides such as nylon 66, polyesters such as polyethylene terephthalate or polybutylene terephthalate, polyacrylates, polymethylmethacrylates, polyacrylonitrile, etc., and mixtures of two or more thereof; in fact, typical plastics and plastics mixtures which would be found in a random sampling of household wastes and industrial plastics scraps. They can be contaminated with (i.e. contain about 2–5% by weight) or in fact contain substantial quantities of (10–30% or even up to 50% by weight) cured thermoset plastics scrap, e.g. polyester thermoset, epoxy, polyurethane, melamine, urea-formaldehyde, cross-linked or cured polybutadiene polyisoprene, poly(butadiene-styrene), butyl, ethylenepropylene-diene rubbers, SMC (sheet molding compounds), S-RIM (structural resin injection moldings), RTM (resin transfer moldings), RRIM (reinforced resin injection molding-thermoset resins reinforced with fibres of glass, Kevlar, carbon, etc.) and mixtures of two or more thereof. They can contain other scrap materials also, such as waste paper, cellulosic fibres, rayons, clay, ceramics, glass, metals such as steel, aluminum and brass, and vegetable materials as commonly found in household and industrial wastes.

The mixed scrap material is first shredded and milled so as to reduce its particle size below 1 mm maximum dimension, and preferably below 0.5 mm maximum dimension. This can be done in a conventional shredder or milling machine. The material is then subsequently advantageously screened, to remove therefrom particles having a size greater than 1 mm, i.e. materials whose particle size has not been sufficiently reduced by the conventional shredding and milling process. It is normally economically advantageous to remove such particles rather than to expend excess energies on a special milling process which will reduce all of the particles to the 1 mm size or less.

Next, a homogenization process takes place using conventional high speed mixing and homogenizing apparatus. This can be done in a dry blender, or in a wet slurry form, e.g. using an aqueous slurry which can also serve as a cleaning and separation medium, to dissolve away some of the components of the mixture which are water soluble and which would not contribute to the properties of the final product. As a result of this process, a macrohomogeneous, powdered material is formed of the mixed scrap. If a wet homogenizing process has been adopted, the mixture is dried. In any event, a substantially free-flowing powdered particulate material is obtained.

Next, the homogenized material is warmed, to an elevated temperature at which it still retains its free-flowing characteristics. This temperature is suitably at least 80° C., but should not be above the softening point of the majority of the thermoplastic components making up a substantial proportion of the thermoplastic portion of the mixture. Typically, the temperature will be between 80° C. and 160° C.

Then the warmed homogenized scrap mixture is blended with a reinforcing material and/or a filler material. This is accomplished by dry blending, e.g. using a dry blender apparatus.

The finished products produced by the processes of the present invention largely derive their physical properties from the reinforcing materials or fillers which are incorporated therein at this stage. When a product of low tensile strength is required, e.g. for use as a floor tile, then fillers alone may be used as the additive material, e.g. additional cured thermoset powder, wood powder, clays and the like. To improve the surface bonding of the fillers to the thermoplastic portions of the scrap mixture, and thereby enhance the strength of the final products, the fillers may be pre-treated on the surface, or otherwise impregnated, with adhesionenhancing chemicals such as a combination of different peroxides. Also, metallic powder, ferrites or other metallic oxides can be added to the fillers to provide, in the interphase between the fillers and the thermoplastic portion of the mixture, an area which can subsequently be heated in an electromagnetic high frequency field for promoting this bonding. In another alternative, this interphase can be enriched with highly polar substances so as to enable the compound to be heated in a microwave heating station, again to improve the adhesive bond between the filler surface and the thermoplastic resin component of the mixture.

The fillers can also be impregnated with uncured liquid/solid thermoset resins (such as phenolics, melamine, polyurethanes etc.) so that when additional heat is applied during the compression molding/laminating process to soften or melt the thermoplastic portion of the blend, this will also initiate the curing process of the uncured thermoset resins. This adds additional strength to the product at high temperatures, thus adding temperature resistance to the finished product. It also reduces production cycle time and increases production output, by allowing the removal of the product from the die, belt or rolls whilst still hot. Because of its improved high temperature strength, such a product can be removed from the forming machinery at a higher temperature compared to a product relying on the adhesion of the thermoplastic portion only, since the strength of such a product only develops at a lower temperature, when the thermoplastic portion solidifies.

Most commonly, it is required to provide products with improved physical properties over those conferred by the scrap material, and so it is usual to dry blend the mixed scrap material with reinforcing material as well as or instead of fillers. Appropriate reinforcing materials include thermoset/composite chips containing glass fibres or other reinforcements as typically found in SMC-, S-RIM-, RTM-, RRIM-, etc. molded products, glass fibres, jute fibres, mineral fibres, synthetic polymeric fibres, carbon fibres, natural textile fibres. It is preferred that the fibrous reinforcing materials have a minimum length of about 10 mm in order to act as a reinforcement. Fibres longer than about 30 mm can be used, but beyond that length no further improvement in reinforcement is obtained.

The compositions according to the invention preferably contain a minimum of 10 parts by weight of thermoplastic material derived from the macro-homogeneous scrap, with correspondingly 90 parts by weight of total other material namely other components of the scrap including residues of thermoset materials, added reinforcing materials and/or added fillers. They preferably contain a maximum of 85 parts by weight of thermoplastic material derived from the macro-homogeneous scrap, but correspondingly 15 parts by weight of total other materials.

When filler alone is being used, without reinforcement, an amount of 70 parts by weight of the filler (i.e. total of all non-thermoplastic and non-reinforcing materials), thereby providing for a minimum 30 parts by weight of scrap-derived thermoplastics, should not be exceeded. A preferred range of all non-thermoplastic components is from 25–70% by weight of the total blend. A typical composition according to the invention comprises 25 parts by weight of mixed thermoplastic derived from the homogenized scrap, 25 parts by weight of other scrap material including thermosets, and 50 parts by weight of optionally pre-treated reinforcing material.

The reinforcing materials can, if desired, be chemically pretreated on their surfaces, as described in connection with the fillers, to improve the bonding between them and the thermoplastic component of the mixed scrap, in the final products. Such chemical surface pre-treatment may also enable the use of microwave or high frequency fields to heat the compound prior to molding, and may also serve to impregnate the product with uncured thermoset resins, both of which factors can enhance the properties of the final product, and can also speed up the production cycle by means described above in connection with the fillers.

The reinforcing materials are preheated to at least the same temperature as that to which the mixed thermoplastic scrap is preheated, prior to blending these two materials together. This avoids the undesirable effects of cooling of the homogenized scrap mixture on contact with the reinforcements. In fact, in some instances, there is advantage to heating the reinforcing material to a temperature above the softening-melting point of the thermoplastic components of the mixed homogenized scrap material, so that the thermoplastic particles therein will stick to the surface of the reinforcing material or fillers, and coat them. When this is done, a molding compound is prepared which can be directly processed in a compression mold or die, or a double belt press or calender.

In any event, by one method or another, the mixture of homogenized scrap material and reinforcements and optionally filler is intimately dry blended together and subsequently delivered to a compression molding apparatus. The apparatus may comprise a conventional compression molding die, a double belt press, or a calendering unit. Compression molding processes using a conventional compression molding die are conducted batch-wise or discontinuously, with the mold being filled with pre-heated molding compound, closed and subjected to appropriate heat and pressure for a sufficient time to fuse into a solid product conforming to the shape of the mold itself. Then the product is cooled to a temperature which allows the product to be removed from the mold or die.

When such a process is accompanied by a preheating step to above the softening point of the thermoplastic components, typically at a temperature above 160° C., prior to entry of the molding composition into the mold cavity, then the compression molding can proceed directly.

When a double belt press or calendering unit is used in the process of the present invention, the molding process is conducted continuously. Then, the preheating of the molding compound can be conducted continuously on a conveyer belt as it is fed to the first zone of the double belt press or the first pair of rollers of the calendering unit. The same typical preheating temperatures as mentioned in the discontinuous process determines whether the compound can be directly cooled down in the first zone or pair of rollers, or whether additional heat has to be added to soften or melt the thermoplastic components or initiate the curing process of added uncured thermoset resins on the surface of the reinforcements. The product is subsequently cooled down to a temperature at which it can conveniently be handled in its semi-finished form.

These compression molding/laminating processes, using standard compression molding molds or dies, double belt presses or calendering units, are highly advantageous in comparison with extrusion/kneading or injection molding processes when applied to products produced by the present invention. Because the products contain inherently incompatible plastics ingredients blended together to give mutual reinforcement, they are, in injection molding and extrusion processes, subjected to excessive heat, friction and shear, which tend to degrade the polymeric materials, as well as to destroy mechanically the added reinforcing additives such as glass fibres and other fibrous reinforcing materials. In addition, the molding compounds which can be used in injection molding and extrusion/kneading processes can only tolerate limited amounts of fillers or reinforcements or other contaminants, because they are required to "flow" in a thermoplastic melt. These factors all contribute to reduced mechanical properties such as brittleness and low modules of elasticity, resulting from the damage to the reinforcing material, and the small amounts of reinforcing material which must necessarily be present. The specific preparation of the molding compound and the ingredients used therein, in the present invention employing compression/laminating processes, do not subject the reinforcing materials and filler materials to such mechanical destruction. Moreover, up to 90% by weight of nonthermoplastic ingredients can be present. Accordingly, superior products result. Molding compositions prepared from mixed scrap materials according to the present invention i.e. including in the process the steps of size reduction and homogenization as described above, optionally in addition using pre-treated reinforcements, can be simply advantageously used in such compression/laminating processes to yield high quality products.

The invention will be further described, for illustrative purposes, in the following specific examples.

EXAMPLE 1

Production of Building Panels

A mixture of scrap materials obtained from a spaceframe vehicle and from household/industrial mixed thermoplastic wastes is used according to the process of the present invention in manufacture of building panels. The vehicle is clad with SMC body panels and has RRIM fenders and S-RIM bumper beams.

The space frame vehicle is initially dissembled into three component categories, namely:

(1) tires and seating upholstery, to be collected for incineration;

(2) SMC body panels, R-RIM fenders and S-RIM bumper beams, for use as the building panel reinforcement as described below; and (3) the remaining spaceframe vehicle is then conventionally recycled and the metal components and other heavy parts are separated. The resulting "fluff" containing a mixture of thermoplastic materials (polyolefins, polyamides, thermoplastic polyesters, styrenics, PVC, acrylics, polycarbonates etc.), cured thermoset materials (typically phenolics, epoxies, natural and synthetic rubbers; polyurethanes, silicones and others) and other organic and inorganic contaminants, is enriched by mixing with other contaminated thermoplastic household/industrial scrap, to give a mixture containing about 70% by weight thermoplastic materials, 30% by weight cured thermoset materials, and other minor amounts of organic and inorganic contaminants.

This mixture is shredded and milled, screened to separate and recycle particles larger than 1 mm, and then fed to a dry blender. Homogenization takes place to form a free-flowing macro-homogeneous powder of mixed scrap thermoplastic and cured thermoset materials, along with other organic and inorganic materials. This macro-homogeneous powder is then pre-heated to 140° C.

In the meantime, the disassembled SMC body panels, R-RIM fenders and S-RIM bumper beams are delivered to a conventional cutting and shredding machine where their size is reduced, and then subjected to a first screening. Particles of maximum dimension less then 30 mm pass this first screening whilst the larger particles are recycled to the cutting and shredding machine. The particles which pass the first screen are then subjected to a second screening. Particles of size less than 10 mm are separated in the second screening and conveyed to the mixing station where the above-described fluff mixture and household/industrial scrap is being mixed together, the entire mixture then proceeding to the screening step to separate the 1 mm particles, followed by homogenization to the macrohomogeneous powder form.

Meanwhile, the particles of thermoset scrap and reinforcing fibre residues which did not pass the second screening, i.e. those of particle size 10–30 mm, are mixed and pre-treated with 8% by weight of uncured phenolic resin in liquid form, to act as the reinforcement in the final product.

This impregnated reinforcement is preheated to 140° C., and then the preheated reinforcement and the macrohomogeneous powder, preheated to the same temperature of 140° C., are brought together in a dry blender and intimately mixed together at a temperature of 140° C. The proportions of substances in the mixture are arranged to give a final blend containing 40% by weight of mixed thermoplastics and 20% of mixed cured thermosets, and other organic and inorganic substances from the macrohomogeneous powder, 36% by weight of reinforcement, and 4% by weight of uncured phenolics resin liquid.

The final blend is conveyed, with heating, to a double belt press, where it is subjected to a pressure of 1 kp/cm$^2$, at a temperature of 190° C., to form a building panel of about 12.5 mm thickness. Prior to exiting the double belt press, the panels are cooled to 120° C., at which temperature they are sufficiently rigid and self-supporting. They are then subjected to conventional finishing processes, namely edge trimming and cutting to length, and left to cool ready for shipping of final product. All the edge trimmings and other waste can be recycled by adding it to the household/industrial waste, prior to shredding and screening.

EXAMPLE 2

Production of Exterior Siding

Exterior siding is prepared from mixed household and industrial waste containing thermoplastics contaminated with other organic and inorganic substances, and including cured thermoset resins and woodchips.

A mixture of household and industrial waste material comprising about 90% by weight of mixed thermoplastics (polyolefins, styremics, polyesters, polyamides, etc.) along with 10% contaminants, predominantly cured thermoset resins such as phenolics, polyesters, polyurethanes, natural and synthetic rubbers, silicones, etc., but also including small amounts of paper, aluminum, dust, etc., is shredded, milled and screened, with recycling of the particles of size greater than 1 mm. The screened material is mixed and homogenized to produce a macrohomogeneous product as in example 1, and then preheated to 140° C.

Meanwhile, wood chips of a typical dimension of 10-30 mm, to act as a reinforcing material, are heated to 140° C.

The macrohomogeneous powdered scrap and reinforcement, both preheated to 140° C., are intimately dry blended together, maintaining the temperature at 140° C., with continuous low shear mixing to avoid damaging the wood fibres, in relative proportions of 80 parts by weight reinforcement and 20 parts by weight of macrohomogenized scrap. This produces a final blend containing 18% mixed thermoplastics, 2% cured thermoset and other organic and inorganic scrap, and 80% by weight of wood chips.

A thin (0.3 mm) aluminum sheet is placed into a compression die heated by steam to 190° C. The powdered, blended mixture is fed to the compression die, where it is compression molded into sheet form at elevated temperature. After compression molding, it is removed from the compression die, supported by the thin aluminum sheet, where it is left to cool and harden.

EXAMPLE 3

Production of Floor Tiles

Floor tiles, requiring little tensile strength, are made according to the process of the invention as follows:

Scrap wire and cable insulation consisting of 80% by weight of thermoplastics (such as polyethylene, polypropylene, polyvinylchloride, polyamides) and 20% scrap thermoset wastes (such as crosslinked polyolefins, cured silicones and synthetic and natural rubber) is shredded, pulverized and screened, with particles of size greater than 1 mm being recycled. The screened material is homogenized and preheated to 140° C. as described in the previous examples, to form a macrohomogeneous powder mixture.

Meanwhile, typical SMC parts as used for automotive body panels, to act as the filler is prepared, consisting essentially of 30% glass fibres, 30% cured thermoset polyester resin and 40% inorganic filler (e.g. calcium carbonate). The mixture is shredded, milled and screened, the particles larger than 0.3 mm being recycled, and the screened product is homogenized and heated to 140° C.

Next, the preheated thermoplastic and thermoset containing macrohomogeneous mixture is intimately blended with and the filler, in equal proportions whilst being kept at 140° C. The final blend contains, by weight, 40% thermoplastic, 10% flexible thermoset, 15% cured thermoset, 20% inorganic fillers and 15% glass powder. It is fed at 140° C. between stacks of pairs of calendering rolls which heat the mixture to 190° C. and press it into flat sheets of the desired thickness. At the last nip, a decorating film or a textile backing film may optionally be applied to a surface. Then the tiles are finished by cooling and cutting. All the cuttings and other waste can be added again to the filler portion prior to shredding and milling.

What is claimed is:

1. A process of recycling and molding scrap plastics material into products of predetermined shape, the scrap material comprising a mixture of thermoplastic material and thermosetting material and optionally containing other organic or inorganic ingredients, the process comprising the steps of:
   (a) shredding and milling the mixture to reduce it to a fine particle size such that substantially all the particles thereof have a maximum dimension not greater than about 1 mm;
   (b) homogenizing the fine particle size mixture so formed into a free-flowing macrohomogeneous powdered form;
   (c) warming the homogenized mixture so formed to an elevated temperature which is at least about 80° C. but is one at which the mixture maintains its free-flowing condition;
   (d) dry blending the warm mixture with at least one additive material selected from reinforcing materials and fillers, in an amount such that the blend contains at least 10% by weight of homogenized thermoplastic components and forming an intimately dispersed blend thereof; and
   (e) compression molding the blend at elevated temperatures and pressures into a product of predetermined shape.

2. The process of claim 1 wherein the additive material is a fibrous reinforcing material, the fibres thereof having a length of at least 10-30 mm.

3. The process of claim 2 wherein the reinforcing material is selected from glass fibres, jute fibres, mineral fibres, synthetic polymeric fibres, carbon fibres and natural textile fibres.

4. The process of claim 3 wherein the reinforcing material comprises at least one set of fibres contained in or otherwise bonded to a thermosetting resin.

5. The process of claim 2, wherein the reinforcing material is preheated to at least the same temperature as the homogenized mixture prior to dry blending therewith.

6. The process of claim 5 wherein the reinforcing material is preheated to a temperature above the softening point of the thermoplastic components of the scrap material.

7. The process of claim 6 wherein the reinforcing material is preheated to a temperature of from about 140°-220° C.

8. The process of claim 3 wherein the blend comprises from about 25%-90% by weight of reinforcing material.

9. The process of claim 3 wherein the blend additionally includes at least one filler, in an amount up to 70% by weight of the blend.

10. The process of claim 8 wherein the reinforcing material is wood chips.

11. The process of claim 9 wherein the filler is paper.

12. The process of claim 1 wherein the homogenization of the fine particle size scrap mixture is conducted by dry mixing and blending.

13. The process of claim 1 wherein the homogenization of the fine particle size scrap mixture is conducted by wet mixing in an aqueous slurry, followed by recovery and drying of the homogenized mixture prior to dry blending with additive material.

14. The process of claim 1 wherein the additive material is chemically surface-treated prior to dry blending with the thermoplastic scrap.

15. The process of claim 1 wherein, prior to compression molding, the blend is preheated to a temperature above the softening point of the thermoplastics components thereof.

16. The process of claim 1 wherein the additive material is a filler having a particle size range of below 0.3 mm.

* * * * *